(12) United States Patent
Byers et al.

(10) Patent No.: US 11,886,771 B1
(45) Date of Patent: Jan. 30, 2024

(54) CUSTOMIZABLE COMMUNICATION SYSTEM AND METHOD OF USE

(71) Applicants: Joseph Byers, Little Elm, TX (US); Corey Blevins, Little Elm, TX (US); Michael Orr, Little Elm, TX (US)

(72) Inventors: Joseph Byers, Little Elm, TX (US); Corey Blevins, Little Elm, TX (US); Michael Orr, Little Elm, TX (US)

( * ) Notice: Subject to any disclaimer, the term of this patent is extended or adjusted under 35 U.S.C. 154(b) by 130 days.

(21) Appl. No.: 17/104,816

(22) Filed: Nov. 25, 2020

(51) Int. Cl.
G06F 3/16 (2006.01)
G10L 15/07 (2013.01)
G10L 15/26 (2006.01)

(52) U.S. Cl.
CPC .............. *G06F 3/167* (2013.01); *G10L 15/07* (2013.01); *G10L 15/26* (2013.01)

(58) Field of Classification Search
CPC .......... G06F 3/167; G10L 15/07; G10L 15/26
See application file for complete search history.

(56) References Cited

U.S. PATENT DOCUMENTS

| | | | | |
|---|---|---|---|---|
| 4,979,216 A | * | 12/1990 | Malsheen | G10L 13/08 704/E13.011 |
| 9,275,635 B1 | * | 3/2016 | Beaufays | G10L 15/32 |
| 9,854,324 B1 | * | 12/2017 | Panchaksharaiah | H04N 21/8106 |
| 9,953,631 B1 | * | 4/2018 | Cuthbert | G10L 15/005 |
| 2014/0257788 A1 | * | 9/2014 | Xiong | H04N 21/25875 704/235 |
| 2019/0279613 A1 | * | 9/2019 | Wheeler | G06F 3/04886 |
| 2020/0074991 A1 | * | 3/2020 | Yalla | G06F 40/268 |
| 2021/0233510 A1 | * | 7/2021 | Datta | G10L 15/005 |
| 2021/0295445 A1 | * | 9/2021 | Cannarsa | G07C 5/008 |
| 2022/0092578 A1 | * | 3/2022 | Ashok | G06F 40/40 |

OTHER PUBLICATIONS

Leemann et al., Voice App: a mobile app for crowdsourcing Swiss German dialect data, 2015 Interspeech , pp. 2804-2808 (Year: 2015).*

* cited by examiner

*Primary Examiner* — Bhavesh M Mehta
*Assistant Examiner* — Darioush Agahi
(74) *Attorney, Agent, or Firm* — Richard Eldredge; Leavitt Eldredge Law Firm

(57) ABSTRACT

A customizable communication system and method of use are described for providing dialect and language options for users to employ during interactions between the user and a third-party application, thereby enhancing user experience. In some embodiments, the system allows a user to select a plurality of dialect and language preferences while interacting with a third-party application offering voice command technology. The selected dialect and language preference is used during the interaction between the user and the third-party application.

1 Claim, 2 Drawing Sheets

CUSTOMIZABLE COMMUNICATION SYSTEM AND METHOD OF USE

BACKGROUND

1. Field of the Invention

The present invention relates generally to communication systems, and more specifically to a customizable communication system that provides for regional dialect and language customization options for users during user interaction with applications.

2. Description of Related Art

Innovations in technology has made it possible for people to communicate in different languages. Many computer applications, for example, enable users to select their preferred language in order to better converse between the user and the application. These selections, however, are limited to the standard form of language which utilizes the most "correct" or neutral dialect. Many individuals communicate in dialects and/or accents that deviate from the standard language and thus face challenges in effectively understanding the information being conveyed.

Hence, it would be advantageous to provide a system and method that improves communication between users and applications by providing regional dialect and language options for users to customize the communication.

Accordingly, although great strides have been made in the area of communication systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
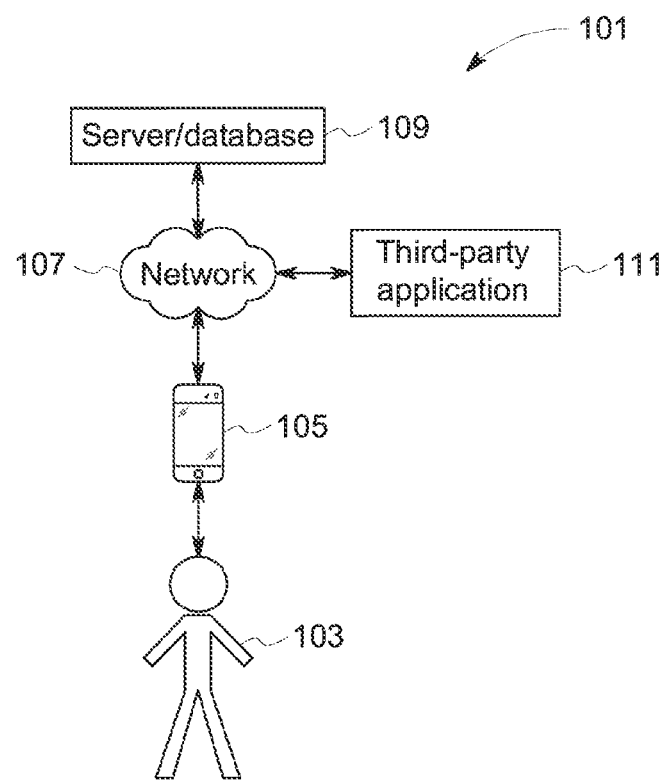
FIG. 1. is a schematic of a customizable communication system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional communication systems. Specifically, the present invention provides a system that enables users to select regional dialect and language options during interaction with computer applications, thereby providing for improved communication between the user and the application. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Further, such a computer program may be stored in a database/server in which a user may access through a network by executing a web browser (e.g., Microsoft Windows, Internet Explorer, Mozilla Firefox, Apple Safari, Google Chrome, Opera, etc.).

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip.

Referring now to the drawings wherein like reference characters identify corresponding or similar elements throughout the several views, FIG. 1 depicts a schematic of a customizable communication system in accordance with a preferred embodiment of the present application. It will be appreciated that system 101 overcomes one or more of the above-listed problems commonly associated with conventional communication systems.

In the contemplated embodiment, system 101 includes one or more users 103, one or more computing devices 105, one or more networks 107, one or more server/databases 109, and one or more third-party applications 111. The user 103 engages with the computing device 105 to interact with one or more third-party applications 111 connected to the network 107.

If and when the third-party application 111 offers voice command technology to communicate with the user 103, the user 103 can customize his or her preferred language output by selecting from a plurality of dialect and language options. The plurality of dialects and language options include, without limitation, accents, dialects unique to a particular region (e.g., Westcoast, USA; Atlanta, Georgia; Bronx, New York; etc.), dialects unique to a particular person, group, and/or character (e.g., celebrity personality, Southern drawl, cartoon figure, etc.), and dialects recorded by the user 103.

In one example, the user 103 can select the option "English (USA)— West Texas" and the voice command technology employed by the third-party application 111 will converse with the user 103 in American English using a West Texan accent.

In another example, the user 103 can select the option "English (USA)— Hip Hop" and the voice command technology employed by the third-party application 111 will converse with the user 103 in American English using vocabulary and language style commonly used in the hip-hop music industry.

In another example, the user 103 can select the option "English (USA)—Vernacular" and the voice command technology employed by the third-party application 111 will converse with the user 103 in American English using vocabulary and language style commonly used in spoken American English as opposed to written American English.

In another example, the user 103 can record his or her personal dialect preferences and select the option "User Dialect" and the voice command technology employed by the third-party application 111 will converse with the user 103 in the dialect preference recorded by the user 103.

The user 103 includes one or more persons, one or more businesses, or a combination thereof interacting with system 101. Examples of businesses include, but are not limited to, financial institutions, corporations, partnerships, limited liability companies, and other business entities.

The computing device 105 is a portable electronic or desktop device configured with a user interface (not shown). Examples of the computing device 105 include, but are not limited to, desktop computers, mobile computers, mobile phones, smart phones, tablets, smart televisions, set-top boxes, personal digital assistants, pagers, kiosks, and medical equipment. The user interface is a means by which the user and the computing device interact. This can include display screens, keyboards, mouse, and appearance of a desktop. In addition, the user interface may be incorporated into any type of software applications, including, but not limited to, desktop applications, mobile applications, and web-based applications to enable users to interact with and control the applications. Further, the user interface can access the server/database 109 via the network 107 using a software application, a browser application, a web browser, a webpage, a website, or a combination thereof.

Examples of network 107 include, but are not limited to, wireless network, wire line network, public network such as the Internet, Intranet, private network, General Packet Radio Network (GPRS), Local Area Network (LAN), Wide Area Network (WAN), Metropolitan Area Network (MAN), cellular network, Public Switched Telephone Network (PSTN), personal area network, and the like. Network 111 may be operable with cellular networks, Bluetooth network, Wi-Fi networks, or any other networks or combination thereof. Specifically, network 107 is classified as a private network and a public network for the purpose of the method described herein. The private network is any network to which access is restricted whereas the public network is a network to which anyone can connect. Further, the network 107 may include network devices, such as network switches, hubs, routers, host bus adapters (HBAs), for providing a communication link between system 101 and other connected devices and/or systems.

The server/database 109 manages network resources, stores information, or a combination thereof. Additionally, the server/database 109 includes one or more servers with distributed processing and one or more databases. The server/database 109 can store, retrieve, and send computer files and data to other computing devices on network 107. Furthermore, the server/database 107 controls the storage, organization, and retrieval of data and information associated with regional dialect and language communications and executes various operations and functions associated with regional dialect and language communications.

The third-party application 111 can be one or more of any type of computing devices and be configured to maintain and provide data to the computing device 105. For example, the third-party application 111 can be affiliated with and managed by a third-party service to store and provide data for the third-party application 111. For example, the third-party application 111 can store and provide web data that can be rendered by the computing device 105 to present a webpage, website, etc., to the requesting user 103.

In addition, the third-party application 111 can provide one or more services that can be accessed by the computing device 105 using specified commands, such as commands defined by an application program interface. A service can be any type of action or transaction, such as providing specified data, providing navigational directions, providing voice commands, etc.

The third-party application 111 can also support connections from a variety of different types of computing devices 105 including, without limitation, desktop computers, mobile computers, mobile phones, smart phones, tablets, smart televisions, set-top boxes, personal digital assistants, pagers, kiosks, and medical equipment.

It should also be appreciated that one of the unique features believed characteristic of the present application is that it provides regional dialect and language options for users to select from during interaction with applications offering voice command technology.

Figure 2:
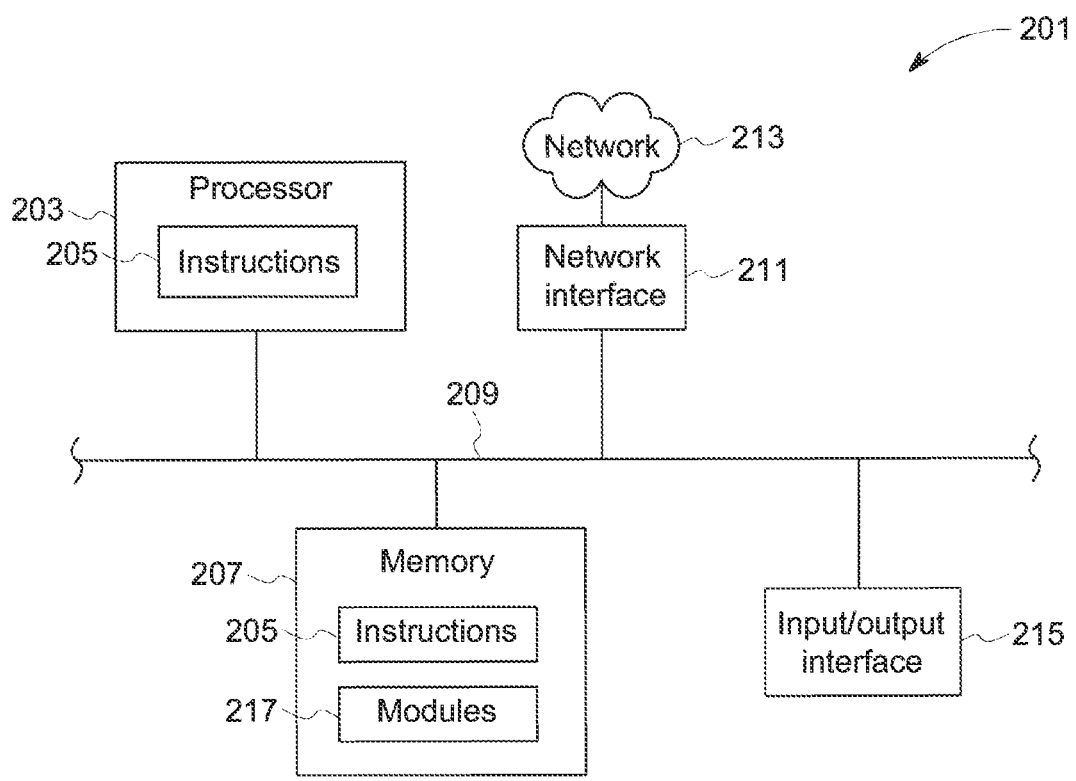
FIG. 2 is a block diagram illustrating an example computer system within which instructions for causing a machine to perform any one or more of the methodologies discussed herein may be executed.

Referring now to FIG. 2, a block diagram of a machine in the example form of a computer system 201 within which a set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The computer system 301 may be implemented as any of a variety of conventional computing devices, including, for example, servers, a desktop PC, a notebook or portable computer, a workstation, a mainframe computer, an entertainment device, cellular phones, smart phones, PDAs, portable computers, desktop computers, a field-programmable gate array device, a microcontroller, tablet computers, phablets, smart televisions, kiosks, medical equipment, an internet appliance, a transceiver, a printing machine (also referred as a printer, or a printing device), a scanning machine, a photocopier machine (also referred as a photocopy machine), communication receivers, data encryption drives, and the like. Further, while only a single machine is illustrated, the term "machine" shall also be taken to include any collection of machines that individually or jointly execute a set (or multiple sets) of instructions to perform any one or more of the methodologies discussed herein.

The computer system 201 includes at least one processor with or without one or more sets of instructions 205, a memory 207 with or without one or more sets of instructions 205, a network interface 211, and an input/output (I/O) interface 215 which communicate with each other via a bus 209. Instructions 205 may reside, completely or at least partially, within the processor 203 and/or memory 207 during execution thereof by system 201. Instructions 205 may include directions for storing instructions, performing one or more functions, and the like. For example, instructions 205 may include detecting one or more files to perform one or more methodologies described herein. Instructions 205 may further be transmitted or received over the network 213 using a transmission medium, for instance network interface 211, and any one of a number of well-known transfer protocols (e.g., HTTP, HTTPS, FTP, TCP, and the like).

The network interface 211 facilitates communication with other computing systems (not shown) via one or more networks 213. Other computing systems, for example, may include conventional computing devices as described above, internet connected devices/systems, or an external storage such as a server, or a cloud computing system.

It is contemplated and will be appreciated that the system 201 may include one or more memory units, one or more processors, and one or more I/O interfaces.

It is also contemplated and will be appreciated that memory 207 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. Memory 207 further includes one or more modules 217 to perform the methodologies described herein.

It is also contemplated and will be appreciated that network 213 may be a wireless network, a wired network, or a combination thereof. Network 213 may also be an individual network or a collection of many such individual networks, interconnected with each other and functioning as a single large network, e.g., the Internet or an intranet. Network 213 may be implemented as one of the different types of networks, such as intranet, local area network (LAN), wide area network (WAN), the internet, near field communication (NFC), and such. Additionally, network 213 may either be a dedicated network or a shared network, which represents an association of the different types of networks that use a variety of protocols. Furthermore, network 213 may include network devices, such as network switches, hubs, routers, host bus adapters (HBAs), for providing a communication link between system 201 and other connected devices and/or systems.

It is also contemplated and will be appreciated that the I/O interface 215 may include a variety of software and hardware interfaces (e.g., a web interface, a graphical user interface, and the like). The I/O interface 215 may allow the system 201 to interact with a user directly or through the user devices. Additionally, the I/O interface 215 may enable system 201 to communicate with other computing devices (not shown), such as web servers and external data servers, or cloud computing systems.

It is likewise contemplated and will be appreciated that the I/O interface 215 can facilitate multiple communications within a wide variety of networks and protocol types, including wired networks, for example, LAN, cable, etc., and wireless networks, such as WLAN, cellular, or satellite. Furthermore, the I/O interface 215 may include one or more ports for connecting a number of devices to one another or to another server.

Figure 3:
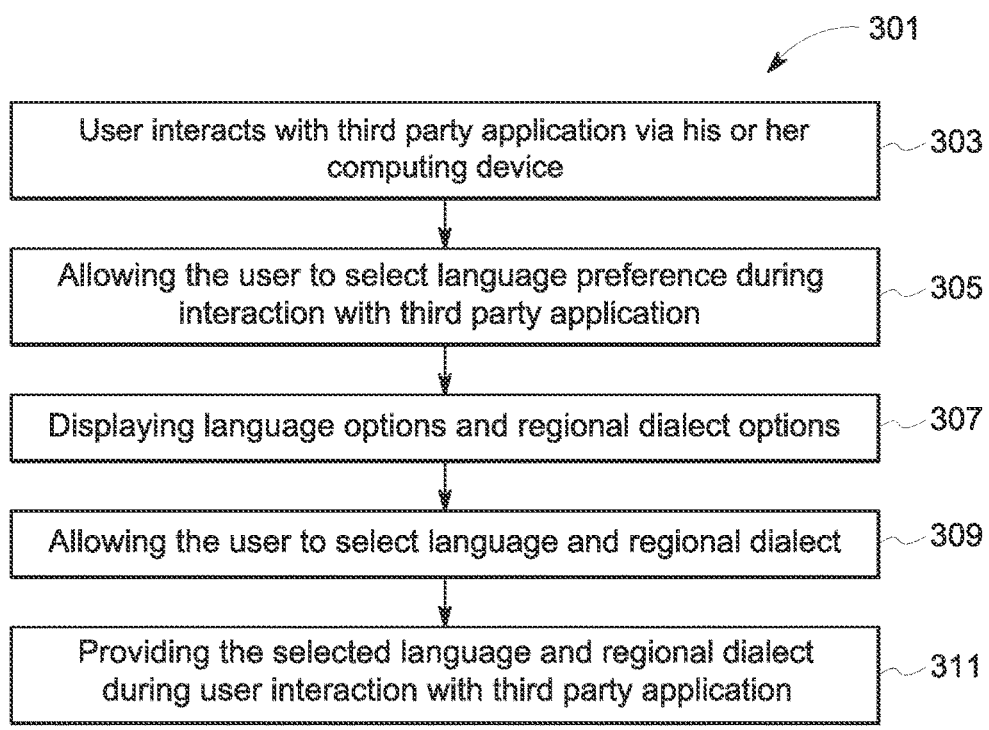
FIG. 3 is a flowchart depicting a method of use associated with the present invention.

In FIG. 3, a flowchart 301 depicts a simplified method of use associated with system 101. During use, a user interacts with a third-party application via his or her computing device and is allowed to select a language preference during the interaction, as shown with box 303, 305. The language options and regional dialect options are displayed, and the user is allowed to select a language and regional dialect, as shown with boxes 307, 309. The selected language and regional dialect are provided during the user's interaction with the third-party application, as shown with box 311.

Figure 4:
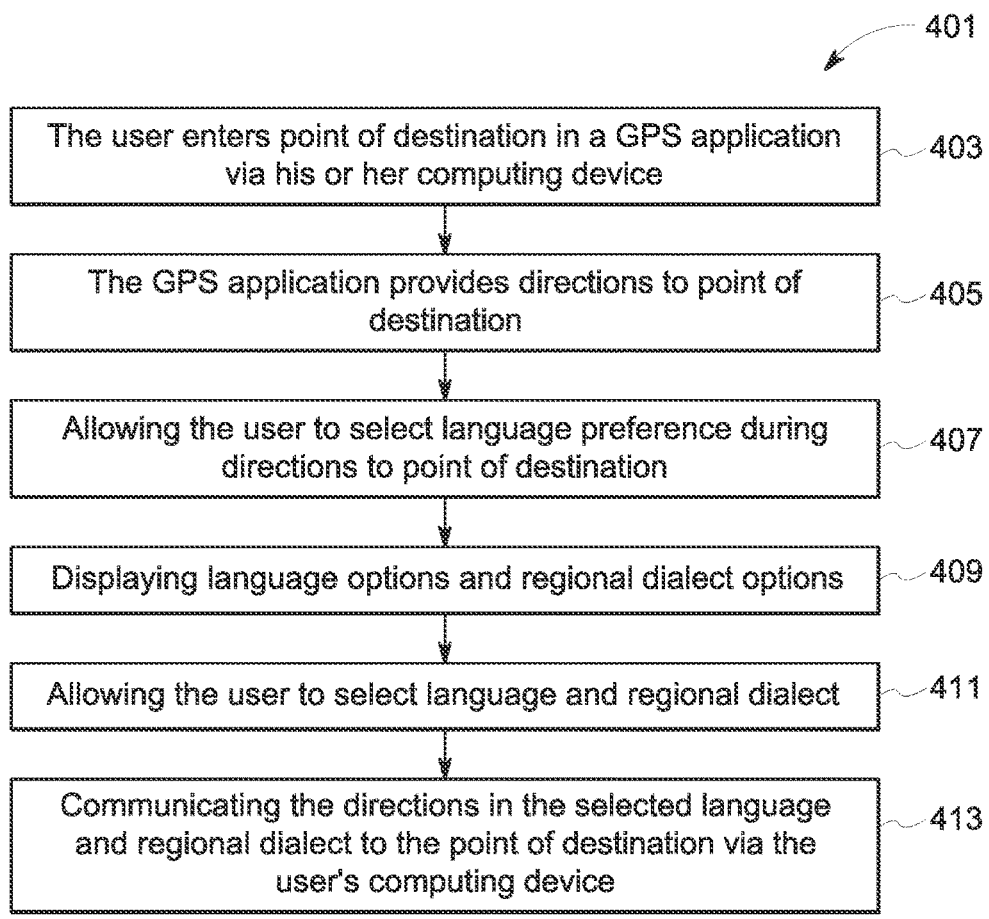
FIG. 4 is a flowchart depicting a method of customizing regional dialect and language during GPS navigation provided by a GPS application in accordance with one or more embodiments of the present application.

In FIG. 4, a flowchart 401 depicting a method of customizing regional dialect and language during GPS navigation provided by a third-party application is shown. During use, the user enters a point of destination in a GPS application via his or her computing device, as shown with box 405. The point of destination can include, without limitation, a residential address, a business address, a landmark, etc.

When the GPS application provides directions to the point of destination, the user is allowed to select a language preference that the GPS application will converse the directions in, as shown with boxes 405, 407. Once the language options and regional dialect options are displayed, the user is allowed to select a language and regional dialect, as shown with boxes 409, 411. The GPS application then communicates the directions in the selected language and regional dialect to the point of destination via the user's computing device, as shown with box 413.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A customizable communication system, comprising:
   a computer system, the computer system having: vernacular for a region
   one or more communication interfaces, the interfaces including an input device and a display device;
   one or more communication components receiving data and information via one or more networks;
   one or more processors for executing computer-executable instructions;
   a recording device configured to record a dialect and a vernacular for a specific region; and
   one or more memories for storing computer-executable instructions that when executed by the one or more processors cause the computer system to perform steps comprising:
   receiving input data indicating a user interacting with a third party by a computing device, the third party providing voice command technology;
   storing a plurality of regional vernaculars and dialects associated with a location in a database;
   retrieving the database and displaying a plurality of regional vernaculars and dialects to the user so that the user may select a preferred dialect and vernacular option to be used by the voice command technology by the computing device, the plurality of regional vernaculars and dialects options including one or more accents, one or more dialects unique to a particular region, one or more dialects unique to a particular person, one or more dialects unique to a particular group, one or more dialects unique to a particular character, one or more dialects recorded by the user, and record one or more new dialects;
   receiving input data indicating the user selected option to record one or more new dialects;
   prompting the user to record one or more new dialects;
   receiving input data indicating the user selected a dialect and language option;
   retrieving data associated with the dialect and language option selected by the user from a server; and
   presenting the voice command technology in the selected dialect and language option during interaction between the user and the third party by the computing device.

* * * * *